United States Patent
Carey et al.

[11] Patent Number: 6,020,667
[45] Date of Patent: Feb. 1, 2000

[54] STATOR BONDING NIB

[75] Inventors: Timothy W. Carey, Grabill, Ind.; Elza L. Campbell, Ozark; James C. Dills, Springfield, both of Mo.

[73] Assignee: General Electric Company, Schenectady, N.Y.

[21] Appl. No.: 09/151,005

[22] Filed: Sep. 10, 1998

[51] Int. Cl.$^7$ ................................................ H02K 1/00
[52] U.S. Cl. ........................ 310/216; 310/259; 29/596; 29/609
[58] Field of Search .................... 310/216, 217, 310/42, 259; 29/609, 596, 738

[56] References Cited

U.S. PATENT DOCUMENTS

| | | | |
|---|---|---|---|
| 2,448,785 | 9/1948 | Dolan | 428/575 |
| 2,761,984 | 9/1956 | Adam et al. | 310/64 |
| 2,774,001 | 12/1956 | Riedel | 51/308 |
| 2,774,897 | 12/1956 | Matthews | 310/217 |
| 2,818,515 | 12/1957 | Dolenc | 310/57 |
| 3,465,188 | 9/1969 | Sisk | 310/217 |
| 3,749,956 | 7/1973 | Reiss | 310/216 |
| 3,787,744 | 1/1974 | Saito | 310/217 |
| 4,012,653 | 3/1977 | Shigeta et al. | 310/217 |
| 4,085,347 | 4/1978 | Lichius | 310/259 |
| 4,110,664 | 8/1978 | Roddy | 310/91 |
| 4,134,036 | 1/1979 | Curtiss | 319/42 |
| 4,214,222 | 7/1980 | Lafaye | 336/84 M |
| 4,215,287 | 7/1980 | Otto | 310/217 |
| 4,864,176 | 9/1989 | Miller et al. | 310/194 |
| 4,881,001 | 11/1989 | Patel et al. | 310/258 |
| 4,882,832 | 11/1989 | Lewis | 29/596 |
| 5,173,629 | 12/1992 | Peters | 310/216 |
| 5,698,925 | 12/1997 | Coupart | 310/217 |
| 5,755,023 | 5/1998 | Neuenschwander | 29/596 |
| 5,799,387 | 9/1998 | Neuenschwander et al. | 29/598 |

Primary Examiner—Nestor Ramirez
Assistant Examiner—Joseph Waks
Attorney, Agent, or Firm—Damin G. Wasserbauer, Esq.; Carl B. Horton, Esq.

[57] ABSTRACT

A stator includes projecting portions extending from an outer edge of a plurality of stator laminations. The projecting portions form a point. When the stator is inserted into a motor housing, the projecting portions scrape along an inner surface of the housing. The contact between the projecting portions and the housing achieves a bond between the stator and the housing.

27 Claims, 3 Drawing Sheets

STATOR BONDING NIB

BACKGROUND OF THE INVENTION

This invention relates generally to dynamo electric machines and, more particularly, to a bonding nib extending from a stator of a dynamo electric machine.

Dynamo electric machines such as an electric motor or generator typically include a housing, a stator, and a rotor assembly. The housing includes a shell having a protective coating and two end shields, and houses at least a portion of the rotor assembly. The stator typically includes a core of magnetic material having an axially extending bore for receiving the rotor assembly. The rotor assembly includes a rotor core and a rotor shaft extending through the core. The rotor assembly extends through the stator opening and the two end shields.

The stator core typically is formed from a plurality of identical laminations coated with an insulating material, aligned, and arranged in a stack held together by clips or an interlock tab. Each lamination includes a plurality of teeth extending radially into the bore. Slots between each of the teeth extend radially outwardly from the bore. The ends of the teeth and the open ends of the slots define the periphery of the bore.

A plurality of coils formed from insulated conductive wire are inserted into selected core slots with portions of the coils at the ends of the core forming end turn regions. The coils are interconnected to form coil groups or poles. The conductive wires which form the coils, are sometimes referred to as stator windings. As an example, a single speed motor typically includes coil groups which establish at least one main winding and an auxiliary or start winding.

The stator is typically interference press fit into the shell of the housing in an attempt to achieve a bond between the stator and the housing shell. Proper bonding between the stator and the housing shell provides adequate grounding of the stator with the housing shell to prevent the stator from arcing. However, as shell coatings and processes have improved to achieve desired corrosion resistance, achieving bond between the coated stator and the coated shell has become more problematic.

Accordingly, it would be desirable to provide a stator that adequately bonds to the housing shell and is durable enough to withstand being interference fit within the shell. In addition, it would be desirable for the stator to be cost effective and to be easy to fabricate.

SUMMARY OF THE INVENTION

These and other objects may be attained by a stator that includes projecting portions extending from an outer edge of a plurality of stator laminations. The stator laminations include an outer diameter and the projecting portions form a tip that extends beyond the outer diameter. The stator laminations are stacked to form a stator core and include a coating of an insulating material that protects the stator from water damage.

The stator is inserted into a motor housing shell that includes an inner surface having a protective coating. The projecting portions scrape along the inner surface of the housing shell when the stator is inserted in the shell. The contact between the projecting portions and the shell removes the coating from the projecting portions and removes the coating from a portion of the housing shell. The contact achieves a bond between the stator and the housing reducing the probability of arcing occurring between the stator and the housing.

The projecting portion contacts the housing shell and grounds the stator to the housing. The grounding of the stator to the housing reduces the occurrence of arcing. The laminations are fabricated from known stamping methods with modified dies. The dies are modified to include notches that correspond to the projecting portions.

DETAILED DESCRIPTION

Figure 1:
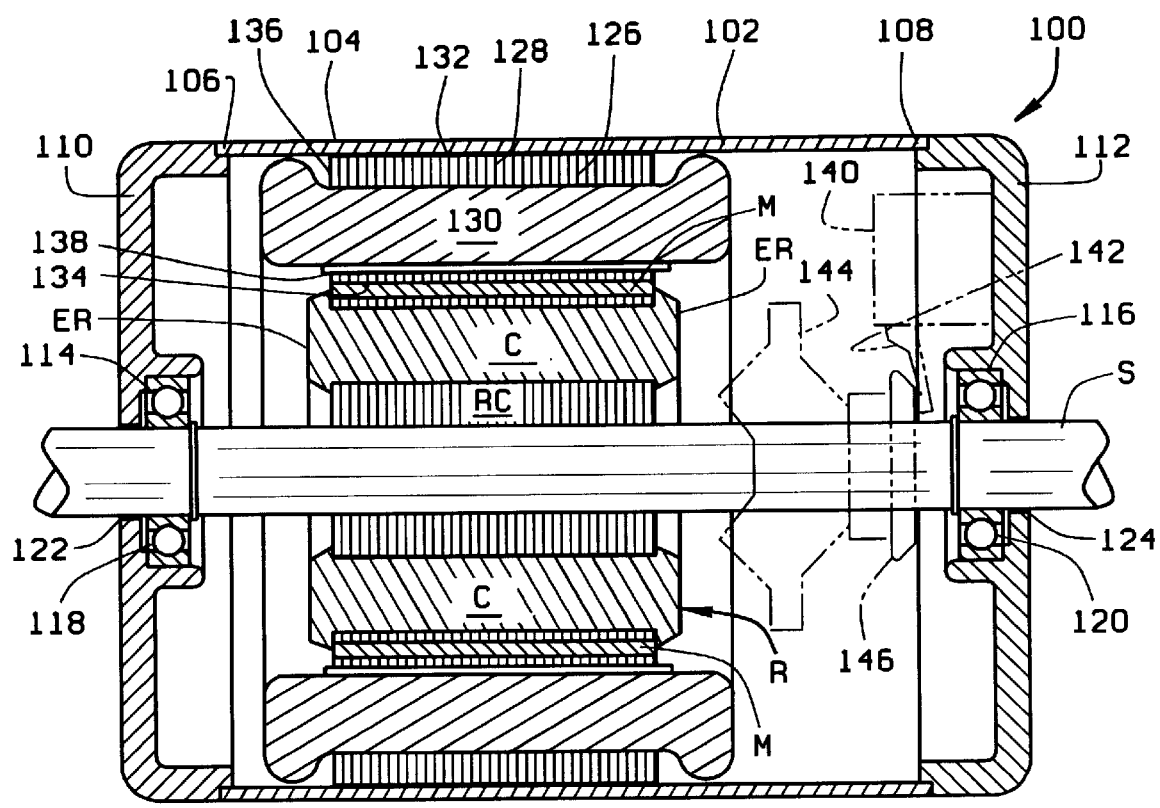
FIG. 1 is a schematic view of an electric motor.

FIG. 1 is a schematic view of an exemplary motor 100 including a housing 102 having a shell 104 with two ends 106, 108. Although the present stator laminations are described herein in the context of an electric motor, it should be understood that the present invention is not limited to practice with any one particular motor. The present invention can be utilized in connection with other dynamo electric machines.

Shell 104 includes a protective coating that reduces the probability of shell 104 corroding. In one embodiment, the protective coating is a paint that covers substantially the entire surface of shell 104. An exemplary paint is a mixture of #CR-648 Powercron Resin and #CP-583 Powercron Paste available from PPG Industries, P.O. Box 127, Springdale, Pa. 15144. A first end shield 110 is connected to end 106 and a second end shield is connected to end 108. End shields 110, 112 include supports 114, 116 for bearing assemblies 118, 120. A rotor shaft S is coaxially aligned with bearing assemblies 118, 120 and extends through openings 122, 124 formed in end shields 110, 112.

Motor 100 also includes a stator 126 having a stator core 128 and stator windings 130. Stator windings 130 include a start winding and at least one main winding. The main winding is wound to form a number of poles. The start winding is wound to form a number of poles equal to the number of poles of the main winding. Stator core 128 is formed from a plurality of stacked stator laminations (not shown). In one embodiment, the laminations are held together by an interlock tab (not shown) that is cut from each lamination and pressed into a slot on an adjacent lamination. Other forms of holding the laminations together include clips that attach to the stack or a strip that is welded to the outer edge of the laminations. The stator laminations include at least one projecting portion 132, e.g., a nib, extending radially outwardly as will be described below in greater detail. Stator core 128 includes an inner surface 134 and an outer surface 136. Inner surface 134 forms a rotor bore 138. Rotor shaft S is concentrically arranged with stator core 128, and a rotor core RC is positioned concentrically with rotor shaft S.

A switching unit 140, shown in phantom, is mounted to end shield 112. Switching unit 140 includes, in one form, a movable mechanical arm 142. A centrifugal force responsive assembly 144, also shown in phantom, is mounted to rotor shaft S and includes a push collar 146 which engages mechanical arm 142. Push collar 146 is slidably mounted on rotor shaft S. Assembly 144 also includes a weighted arm and spring (not shown in detail) secured to rotor shaft S. The weighted arm is calibrated to move from a first position to a second position when the rotor speed exceeds a predetermined speed. When the weighted arm moves to the second position, push collar 146 also moves from a first position to a second position. As a result, mechanical arm 142 of switching unit 140 moves from a first position to a second position, which causes switching unit 140 to switch from a first circuit-making position to a second circuit-making position. Switching unit 140 is utilized separately in some applications (without arm 142) and switching unit 140 and assembly 144 are utilized in combination in other applications. Alternatively, the switching unit can be a capacitor (not shown) as well known in the art.

In operation, and at motor start-up, the stator start winding and the main winding are energized. The magnetic fields generated by such windings induce currents in conductors C of motor rotor R, and the magnetic fields of such windings and conductors C couple and rotor R begins to rotate. Once rotor R has sufficient speed, the start winding is de-energized. When the rotor speed equals the synchronous speed, the magnetic fields of rotor permanent magnets M couple with, and "lock" into, the magnetic fields generated by the main winding. Rotor R then rotates at substantially the synchronous speed.

Figure 2:
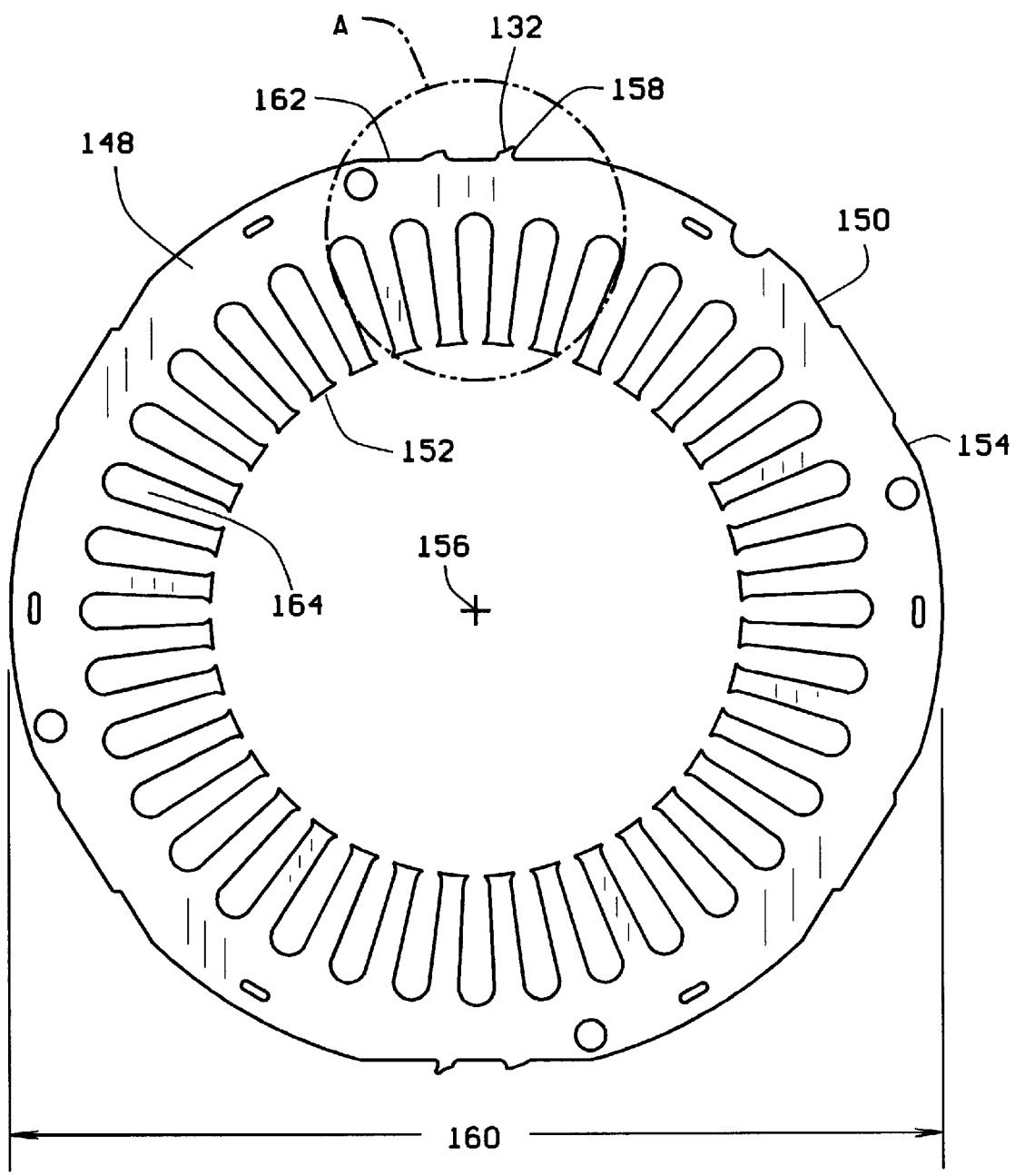
FIG. 2 is a schematic view of a stator lamination including a projecting portion.
Figure 3:
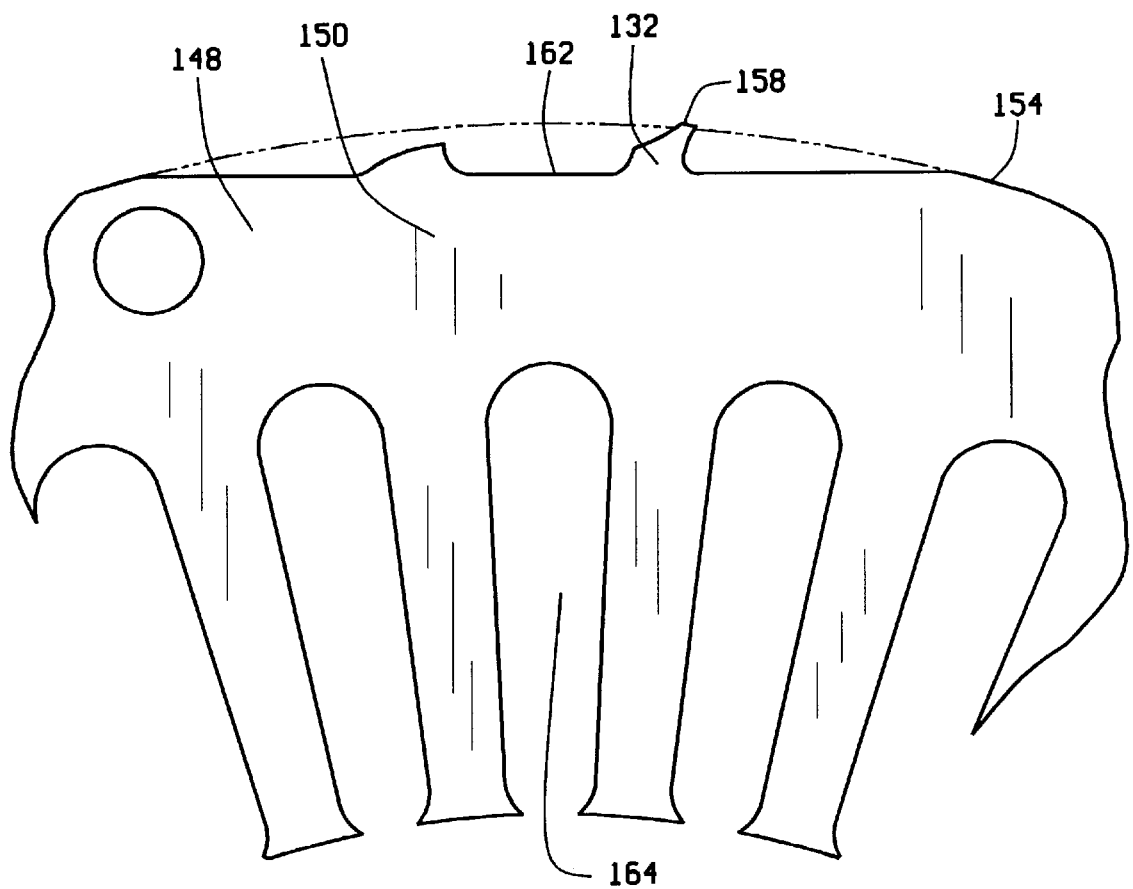
FIG. 3 is a schematic view of portion A of the stator lamination shown in FIG. 2.

FIGS. 2 and 3 are schematic views of a stator lamination 148 including projecting portion 132. Stator lamination 148 also includes a top surface 150, a bottom surface (not shown), an inner edge 152, an outer edge 154, and a center 156. Stator lamination 148 is coated with a protective insulating coating. In one embodiment, the protective coating improves moisture resistance. An exemplary insulating coating is a varnish such as varnish # 413C123 available from Valspar Corporation, 202 West Jacobs Avenue, Fort Wayne, Ind. 46808.

Projecting portion 132 extends from outer edge 154 and forms at least one point 158. Stator lamination 148 includes an outer diameter 160 sized to fit within a motor housing shell (not shown) having an inner diameter (not shown). In one embodiment, stator lamination 148 is substantially circular and includes at least one flattened area 162. Of course, lamination 148 could be substantially circular without having a flattened area, or it could be square with rounded corners. In addition, lamination 148 could have other shapes. Projecting portion 132 may extend from either flattened area 162, or it may extend from a rounded area of outer edge 154. Further, outer diameter 160 is smaller than the inner diameter of the housing shell and point 158 projects substantially radially away from center 156 of stator lamination 148 extending beyond outer diameter 160.

When stator laminations 148 are inserted into the housing shell, projecting portion 132 contacts the inner surface of the housing shell. This contact removes the stator lamination coating as well as the housing shell coating at the contact points and provides a metal to metal contact. The removal of the coatings from the housing shell and stator laminations 148 enables stator lamination 148 to achieve an adequate bond with the housing shell and reduces the possibility of arcing between stator lamination 148 and the housing shell.

In operation, stator laminations 148 are stacked and held together to form a stator core (not shown). Outer edges 154 align to form a substantially continuous outer surface (not shown) of the stack. The outer surface includes a plurality of projecting portions that extend radially outwardly. Inner edges 152 include a plurality of slots 164 extending radially outwardly from center 156. Inner edges align to form a bore (not shown) extending through the stator core. The bore includes a plurality of axial slots (not shown) extending radially outwardly. A plurality of coils formed from insulated conductive wire is inserted into the slots. A portion of the coils form end turn regions. A protective coating is applied to the stator core and windings to provide moisture protection to the core and windings and also to hold the coils in place.

With respect to the manufacture and assembly of the stator (not shown), laminations 148 are stamped from steel with a die (not shown). The die includes notches that form projecting portions 132. As is well known, each lamination may be annealed or otherwise treated so that a coating is formed thereon. Laminations 148 are then stacked to a desired height to form the stator core (not shown). Stator laminations 148 are stacked so that slots 164 are axially aligned to form a plurality of slots that extend radially outwardly. A plurality of coils formed from insulated conductive wire is inserted into the slots in the stack of stator laminations 148. A protective coating is applied to the stator core and windings. In one embodiment, the protective coating provides moisture protection to the core and windings and also holds the coils in place.

The stator is inserted in the motor housing so that projecting portions 132 contact an inner surface of the housing. In one embodiment, the stator is interference press fit into the housing. The contact removes the protective coating on both the projecting portion and on at least a portion of the housing. In one embodiment, the contact cuts through the paint on the housing inner surface and scrapes off the varnish on the point of the projecting portion. After the coatings are removed, the housing and projection portion 132 are in metal to metal contact.

The stator core includes projecting portions that extend beyond an outer diameter of the stator laminations and provide a bond between the stator and the housing shell. The bond grounds the stator to the housing shell and prevents arcing by the stator. The stator laminations are cost effective to manufacture since they can be fabricated by known methods with a modified die.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

We claim:

1. A stator for mounting within a motor housing including a coating, said stator comprising:

at least one stator lamination including a bore, an inner edge, and an outer edge, said outer edge having an outer diameter, said stator including at least one projecting portion that extends beyond said outer diameter, said projecting portion configured to remove the coating from at least a portion of the housing when said stator is inserted into the housing.

2. A stator in accordance with claim 1 wherein said at least one stator lamination comprises a plurality of stacked stator laminations, said outer edges align to form a substantially continuous surface, said inner edges align to form said bore.

3. A stator in accordance with claim 2 wherein said plurality of stacked laminations includes a protective coating that is removed from at least a portion of the projecting portion when said stator is inserted into the housing.

4. A stator in accordance with claim 1 wherein said projecting portion forms a point that extends beyond said outer diameter.

5. A stator in accordance with claim 4 wherein said projecting portion is a nib.

6. A stator in accordance with claim 1 wherein said outer edge comprises at least one flattened area.

7. A stator in accordance with claim 1 wherein said inner edge comprises a plurality of slots that extend radially outwardly from said bore.

8. A stator in accordance with claim 7 further comprising a plurality of coils formed from insulated conductive wire inserted into said slots, said coils forming end turn regions.

9. A stator configured to be inserted within a motor housing, said stator comprising:
   a plurality of stacked laminations, said laminations including an inner edge having a plurality of slots and an outer edge including at least one projection for contacting the motor housing, said projection comprising a nib configured to contact the motor housing.

10. A stator in accordance with claim 9 further including a bore, wherein said inner edges align to form said bore.

11. A stator in accordance with claim 9 wherein said nib includes a point configured to contact the motor housing.

12. A stator in accordance with claim 11 wherein said stator includes a protective coating configured to be removed from at least a portion of the nib when said stator is inserted into the housing.

13. A stator in accordance with claim 11 wherein the housing includes a coating, said nib configured to remove the coating from at least a portion of the housing when said stator is inserted into the housing.

14. A stator in accordance with claim 9 further comprising a plurality of coils formed from insulated conductive wire inserted into said slots.

15. A stator in accordance with claim 9 wherein said stator laminations are substantially circular.

16. A stator in accordance with claim 9 wherein said stator laminations are substantially square with rounded corners.

17. An electric motor comprising:
   a motor housing comprising a shell with first and second ends, a first end shield mounted to said first shell end, and a second end shield mounted to said second shell end, said first and second end shields comprising bearing supports having bearings therein;
   a stator positioned within said shell, said stator including a plurality of stacked laminations comprising an inner edge, an outer edge, and an outer diameter, said outer edge including a projecting portion extending radially beyond said outer diameter and forming a point, said point configured to contact said motor housing, said stacked laminations forming a stator core including an inner surface forming a bore extending through said stator core and an outer surface; and
   a rotor assembly including a rotor shaft, said rotor assembly positioned within said stator bore, said rotor shaft extending through said end shields and rotatably supported by said bearings.

18. A motor in accordance with claim 17 wherein said stator includes a means for holding together said plurality of stacked laminations so that said lamination inner edges align to form said bore extending through said stator core.

19. A motor in accordance with claim 17 wherein said outer edge comprises at least one flattened area and said projecting portion is a nib.

20. A motor in accordance with claim 19 wherein said housing shell includes an inner diameter, said stator lamination outer diameter smaller than said housing shell inner diameter, said point of said nib extending radially beyond said outer diameter.

21. A motor in accordance with claim 17 wherein said stator core inner surface comprises a plurality of slots that extend toward said outer surface.

22. A motor in accordance with claim 22 wherein said stator further comprising a plurality of wire coils inserted into said slots and forming end turn regions.

23. A motor in accordance with claim 17 wherein said plurality of stator laminations include a coating to improve moisture resistance, wherein said coating is removed from at least a portion of said projecting portion when said stator is inserted into said housing shell.

24. A motor in accordance with claim 17 wherein said housing shell includes an inner surface having a protective coating, said coating removed from at least a portion of said housing shell when said stator is inserted into said housing shell.

25. A method of assembling a stator into a motor housing, the stator including a plurality of stacked laminations that include an inner edge, an outer edge, and an outer diameter, the outer edge includes a projecting portion that forms a point extending beyond the outer diameter, said method including the steps of:
   applying a first protective material to a surface of the stator laminations;
   applying a second protective material to a surface of the motor housing;
   inserting the stator assembly into the motor housing; and
   removing the protective material from a portion of the housing.

26. A method in accordance with claim 25 wherein said step of inserting the stator assembly further comprises the step of pressing the stator assembly into the housing and contacting a housing inner surface with the projecting portion.

27. A method in accordance with claim 26 wherein said step of contacting the housing inner surface comprises the steps of:
   removing the protective material from the projecting portion to provide metal to metal contact between the stator and the housing.

* * * * *